United States Patent
Cai et al.

(10) Patent No.: US 10,097,253 B2
(45) Date of Patent: Oct. 9, 2018

(54) CONTROL DEVICE, COMMUNICATION NODE AND METHODS THEREOF

(71) Applicant: HUAWEI TECHNOLOGIES CO., LTD., Shenzhen, Guangdong (CN)

(72) Inventors: Tao Cai, Kista (SE); Kari Juhani Leppanen, Helsinki (FI); Henrik Lundqvist, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/592,478

(22) Filed: May 11, 2017

(65) Prior Publication Data

US 2017/0250748 A1    Aug. 31, 2017

Related U.S. Application Data

(63) Continuation of application No. PCT/EP2014/074334, filed on Nov. 12, 2014.

(51) Int. Cl.
*H04B 7/02* (2018.01)
*H04B 7/06* (2006.01)
(Continued)

(52) U.S. Cl.
CPC ............ *H04B 7/0617* (2013.01); *H01Q 3/26* (2013.01); *H04B 7/1555* (2013.01); *H04B 7/15535* (2013.01); *H04W 40/06* (2013.01)

(58) Field of Classification Search
CPC ... H04B 7/0617; H04B 7/1555; H04W 52/00; H04W 52/04; H04W 52/10
See application file for complete search history.

(56) References Cited

U.S. PATENT DOCUMENTS

| 7,646,752 B1 | 1/2010 | Periyalwar et al. |
| 8,712,321 B1 * | 4/2014 | Dankberg .......... H04B 7/18513 370/316 |

(Continued)

OTHER PUBLICATIONS

International Search Report, dated Jul. 22, 2015, in International Application No. PCT/EP2014/074334 (5 pp.).

(Continued)

*Primary Examiner* — Tuan Pham
(74) *Attorney, Agent, or Firm* — Staas & Halsey LLP

(57) ABSTRACT

A control device (100) comprises a processor (101) and a transmitter (103) is provided; wherein the processor (101) is configured to generate a composite beam control signal S which comprises antenna beam control information for communication nodes of a communication path; wherein the transmitter (103) is configured to transmit the composite beam control signal S to at least one communication node. A communication node (300) comprises a processor (301), a transceiver (303), reception antenna elements (305) and transmission antenna elements (307) is provided; the transceiver (303) is configured to receive a composite beam control signal S; the processor (301) is configured to derive antenna beam control information associated with the communication node (300) from the composite beam control signal S; and control the beam of the reception antenna elements (305) or the beam of the transmission antenna elements (307) according to the antenna beam control information.

14 Claims, 3 Drawing Sheets

201 — Generating a composite beam control signal S, wherein the composite beam control signal S comprises antenna beam control information for communication nodes of a communication path comprising a source communication node, at least one intermediate communication node and a destination communication node 203 — Transmitting the composite beam control signal S to at least one communication node of the communication path

(51) Int. Cl.
*H01Q 3/26* (2006.01)
*H04B 7/155* (2006.01)
*H04W 40/06* (2009.01)

(56) References Cited

U.S. PATENT DOCUMENTS

| | | |
|---|---|---|
| 2003/0050099 A1 | 3/2003 | Izadpanah |
| 2007/0218910 A1 | 9/2007 | Hill et al. |
| 2008/0076349 A1 | 3/2008 | Hwang et al. |
| 2013/0137444 A1 | 5/2013 | Ozluturk |
| 2014/0177542 A1* | 6/2014 | Novak ............... H04W 72/042 370/329 |

OTHER PUBLICATIONS

Godara, L., *Application of Antenna Arrays to Mobile Communications, Part II: Beam-Forming and Direction-of-Arrival Considerations*, Proceedings of the IEEE, vol. 85, No. 8, Aug. 1997, pp. 1195-1245.
*Digital Communications*, pp. 849-852, XP2742084.
International Search Report, dated Jul. 22, 2015, in International Application No. PCT/EP2014/074334 (3 pp.).
John G. Proakis, *Digital Communications*, 1995, McGraw-Hill, XP002742084, pp. 849-852.

* cited by examiner

CONTROL DEVICE, COMMUNICATION NODE AND METHODS THEREOF

CROSS-REFERENCE TO RELATED APPLICATIONS

This application is a continuation of International Application No. PCT/EP2014/074334, filed on Nov. 12, 2014, the disclosure of which is hereby incorporated by reference in its entirety.

TECHNICAL FIELD

The present disclosure relates to a control device, a communication node, and a wireless multi-hop communication system comprising such devices.

Furthermore, the present invention also relates to corresponding methods, a computer program, and a computer program product.

BACKGROUND

In wireless multi-hop communication systems first and last nodes establish a wireless communication link through multiple intermediate communication nodes of a multi-hop communication system. The first node in a communication path may be denoted start node or source node and the last node in the communication path may be denoted destination node or end node. Hence, a communication path comprises a source (start) communication node, at least one intermediate communication node and a destination (end) communication node.

Furthermore, in modern wireless communication systems communication nodes often use a plurality of antenna elements to generate directional antenna gain. Directional antenna pattern is often termed as antenna beam or antenna beams, and the method is often referred to as beamforming in the art. Normally, antenna beams of a transmitter is used to aim towards the intended receiver and the antenna beams of a receiver is used to aim towards the intended transmitter in order to increase the reception quality of communication between communication nodes.

For a wireless multi-hop communication link between source node and destination node, the throughput will be impacted on how fast the antenna beams can be formed for each involved node in the communication path.

Hence, in a network comprising such multi-hop links, due to the user mobility and traffic variation spatially and temporally, there is need for fast beamforming of multiple communication nodes in order to obtain optimal network performance, such as link throughput, network capacity, energy efficiency, etc.

SUMMARY

An objective of embodiments of the present invention is to provide a solution which mitigates or solves the drawbacks and problems of conventional solutions.

Another objective of embodiments of the present invention is to provide a solution for efficient antenna beam forming with low signalling overhead.

The above objectives are solved by the subject matter of the independent claims. Further advantageous implementation forms of the present invention can be found in the dependent claims.

According to a first aspect of the invention, the above mentioned and other objectives are achieved with a control device for a wireless multi-hop communication system, the control device comprising a processor and a transmitter;

wherein the processor is configured to
generate a composite beam control signal S, wherein the composite beam control signal S comprises antenna beam control information for communication nodes of a communication path comprising a source communication node, at least one intermediate communication node and a destination communication node; and
wherein the transmitter is configured to
transmit the composite beam control signal S to at least one communication node of the communication path.

An "or" in this description and the corresponding claims is to be understood as a mathematical OR which covers "and" and "or", and is not to be understand as an XOR (exclusive OR).

The composite beam control signal S is designed such that the beam control information which is embedded within the composite beam control signal S will impact the transmission antenna and/or the reception antenna of communication nodes, and change the beam direction of the transmission antenna and/or reception antenna. The transmission antenna and/or the reception antenna comprise multiple antenna elements for beam forming. The beam control information can e.g. be the signal power weight information (precoding), or can be signal phase information in different representations. Normally, when different sets of power weight or different phase value are exerted onto the antenna elements, the resulting antenna beam will point in different directions. Within the same set, normally for different antenna elements, the power weight or phase value can be different or the same depending on the application.

It should further be noted that the composite beam control signal S is a single signal transmitted to at least one communication node of the communication path.

By generating a composite beam control signal S according to the present invention and transmitting the composite beam control signal S to at least one communication node of the communication path a number of advantages are provided. First of all the signalling overhead can be held low. Further, efficient beam forming in multi-hop communications is also provided, meaning e.g. low latency and memory-less handling for the communication nodes of the communication path. Especially, fast beamforming is possible with the use of the present composite beam control signal S.

In a first possible implementation form of the control device according to the first aspect, the composite beam control signal S has the form $$S = \sum_{i=1}^{N} C_i \cdot \phi_i,$$

where $\phi_i$ is the beam forming information for communication node $i=1, \ldots, N$, where $i=1$ is the index for the source communication node and $i=N$ is the index for the destination communication node, and $C_i$ is a communication node identity associated with communication node $i$.

With this implementation form only one signal needs to be generated and passed to multiple communication nodes along the multi-hope communication path without the need to generate multiple beam control signals for those communication nodes since the necessary information is comprised in the composite beam control signal S, such as communication node identity and associated beam forming information.

In a second possible implementation form of the control device according to the first implementation form of the first aspect, the communication node identities $C_i$, $i=1, \ldots, N$, are orthogonal code sequences meaning that different sequences are orthogonal to each other.

By using orthogonal code sequences representing communication node identities, the communication node can derive its own beam control information, and ignore the beam control information intended for other communication nodes in the communication path.

In a third possible implementation form of the control device according to the any of the first or second implementation forms of the first aspect, the beam forming information $\phi_i$ is phase information or phase shift information for the antenna elements of communication node i.

The phase information or the phase shift information is used to control the antenna beam direction of the antenna elements of the communication node. Using phase information or phase shift information for controlling the antenna beam direction is straight forward implementation.

In a fourth possible implementation form of the control device according to the third implementation form of the first aspect, the phase shift information is a phase shift difference between neighboring antenna elements, or a phase shift for each antenna element.

By using phase shift information instead of phase information, the amount of such information can be decreased meaning lower overhead. For example, for n (n>2) antenna elements, only one base phase information and one phase shift information are needed, which will be less than the n phase information for the antenna elements.

In a fifth possible implementation form of the control device according to the any of the previous implementation forms of the control device according to the first aspect or the control device as such, the processor further is configured to generate a composite power level signal, wherein the composite power level signal indicates transmission power levels for the communication nodes; and wherein the transmitter further is configured to
transmit the composite power level signal to at least one communication node of the path.

With this implementation form, the transmission power of communication nodes is controlled in the similar manner as for controlling the antenna beam direction. In multi-hop communication path, different communication node might be in different radio environment so that different transmission power shall be used. By controlling the power the transmission power for the composite beam control signal can be adapted to the radio environment.

In a sixth possible implementation form of the control device according to the any of the previous implementation forms of the control device according to the first aspect or the control device as such, the control node is located in the source communication node.

With this implementation form, the source communication node will be able to control other communication nodes along the multi-hop communication path and hence no stand-alone control node is needed.

In a seventh possible implementation form of the control device according to the sixth implementation form of the first aspect, the transmitter further is configured to
transmit the composite beam control signal S to a first intermediate communication node of the path.

With this implementation form the transmission antenna of first intermediate communication node will be able to point to the second intermediate communication node and the reception antenna of the first intermediate communication node will be able to point to the source communication node. In such manner, the transmission antenna direction or the reception antenna direction of the communication nodes in the communication path can be controlled or optimized with one single signal S, without the need for the control device to send antenna direction signals to all the communication nodes in the communication path in a broadcast manner, hence no need for the relatively-high power signal transmission from for the control device to, for example, one of the intermediate communication nodes or the destination node. Also, there is no need for a wire-line signal transmission from the control node to one of the intermediate communication nodes or the destination node for the purpose of antenna beam direction control.

According to a second aspect of the invention, the above mentioned and other objectives are achieved with a communication node for a multi-hop communication system, the communication node comprising a processor, a transceiver, reception antenna elements and transmission antenna elements; wherein the transceiver is configured to
receive a composite beam control signal S, wherein the composite beam control signal S comprises antenna beam control information for communication nodes of a communication path comprising a source communication node, at least one intermediate communication node and a destination communication node; wherein the processor is configured to
derive antenna beam control information associated with the communication node from the composite beam control signal S; and
control the beam of the reception antenna elements or the beam of the transmission antenna elements according to the antenna beam control information.

It should be understood that the expression "control the beam of the reception antenna elements or the beam of the transmission antenna elements" should mean the same as control the beam of the reception antenna elements and/or the beam of the transmission antenna elements, i.e. the beam of the reception antenna elements may be controlled or the beam of the transmission antenna elements may controlled, or the beam of the reception antenna elements and the beam of the transmission antenna elements may be controlled using the antenna beam control information.

By receiving the composite beam control signal S, deriving the beam control information, and controlling the beam of the reception antenna elements or the beam of the transmission antenna elements the transmission and reception antenna beam direction of communication nodes along multi-hop communication path can be controlled with one single composite beam control signal reducing overhead. Further, low latency and memory-less handling of the communication nodes is also possible.

In a first possible implementation form of the communication node according to the second aspect, the transceiver further is configured to
forward the composite beam control signal S to a next communication node of the communication path.

With this implementation form the transmission antenna of first intermediate communication node will be able to point to the second intermediate communication node and the reception antenna of the first intermediate communication node will be able to point to the source communication node. In such manner, the transmission antenna direction or the reception antenna direction of the communication nodes in the communication path can be controlled or optimized with one single signal S, without the need for the control device to send antenna direction signals to all the communication nodes in the communication path in a broadcast manner, hence no need for the relatively-high power signal transmission from for the control device to, for example, one of the intermediate communication nodes or the destination node. Also, there is no need for a wire-line signal transmission from the control node to one of the intermediate communication nodes or the destination node for the purpose of antenna beam direction control.

In a second possible implementation form of the communication node according to the first implementation form of the second aspect or the communication node as such, the composite beam control signal has the form $$S=\Sigma_{i=1}^{N}C_i\cdot\phi_i,$$

where $\phi_i$ is the beam forming information for communication node i=1, ..., N, where i=1 is the index for the source communication node and i=N is the index for the destination communication node, and $C_i$ is a communication node identity associated with communication node i.

With this implementation form only one signal needs to be created and passed to multiple communication nodes along the multi-hope communication path without the need to create multiple beam control signal for those communication nodes since the necessary information is comprised in the composite beam control signal S, such as communication node identity and associated beam forming information.

In a third possible implementation form of the communication node according to the second implementation form of the second aspect, the processor further is configured to
derive the beam forming information $\phi_i$ for the communication node (300) according to $$S\cdot C_i=(\Sigma_{i=1}^{N}C_i\cdot\phi_i)\cdot C_i=\phi_i.$$

This implementation form gives a precise expression for deriving the beam forming information $\phi_i$ which is easy to implement in applications.

In a fourth possible implementation form of the communication node according to the second or third implementation form of the second aspect, the beam forming information $\phi_i$ is phase information or phase shift information; and wherein the processor further is configured to
control the beam of the reception antenna elements or the beam of the transmission antenna elements by phase shifting the reception antenna elements or phase shifting the transmission antenna elements according to the phase shift information.

The phase information or the phase shift information is used to control the antenna beam direction of the antenna elements of the communication node in an easy manner.

In a fifth possible implementation form of the communication node according any of the previous implementation forms of the second aspect, the transceiver further is configured to
receive a composite power level signal, wherein the composite power level signal indicates transmission power levels for the communication nodes; wherein the processor further is configured to
derive the transmit power level associated with the communication node from the composite power level signal; and wherein the transceiver further is configured to transmit on the transmission antenna elements with the derived power level.

With this implementation form the transmission power of communication nodes is controlled in the similar manner as for controlling the antenna beam direction. In multi-hop communication path, different communication node might be in different radio environment so that different transmission power shall be used. By using power control the transmission power for the composite beam control signal can be adapted to the radio environment.

In a sixth possible implementation form of the communication node according any of the previous implementation forms of the second aspect, the processor is a processing circuitry, and wherein the processing circuitry is configured to
derive the antenna beam control information by analogue signal processing.

An advantage with the sixth possible implementation form is that since the antenna beam control information is derived by analogue signal processing there is no need for the involvement of processor and memory and thus the latency that is introduced by the processor instruction cycle and the latency that is introduced by memory access/reading can be avoided. The reaction delay of the receiving node is only constrained by the physical properties of hardware components and is much shorter.

In an seventh possible implementation form of the communication node according any of the previous implementation forms of the second aspect, the processor further is configured to
control the beam of the transmit antenna elements according to the antenna beam control information, while
control the beam of the reception antenna elements in a static omni-directional or wide beam forming state.

With this implementation form only transmission antenna beam direction of communication nodes is controlled when there is no need for using narrow beam reception antenna, for example when the gain of the narrow beam of the transmission antenna is high enough that there is sufficient reception quality. With wide or omni-directional reception beam of the reception antenna, the alignment of the narrow transmission antenna beam and the narrow reception antenna beam can be avoided.

According to a third aspect of the invention, the above mentioned and other objectives are achieved by a wireless multi-hop communication system comprising at least one control device according to any of the implementation forms of the control device according to the first aspect or the control device as such and at least one communication node according to any of the implementation forms of the communication node according to the second aspect or the communication node as such.

According to a fourth aspect of the invention, the above mentioned and other objectives are achieved by a method for a wireless multi-hop communication system; the method comprising
generating a composite beam control signal S, wherein the composite beam control signal S comprises antenna beam control information for communication nodes of a communication path comprising a source communication node, at least one intermediate communication node and a destination communication node; and
transmitting the composite beam control signal S to at least one communication node of the communication path.

In a first possible implementation form of the method according to the fourth aspect, the composite beam control signal S has the form $$S=\Sigma_{i=1}^{N}C_i\cdot\phi_i,$$

where $\phi_i$ is the beam forming information for communication node i=1, ..., N, where i=1 is the index for the source communication node and i=N is the index for the destination communication node, and $C_i$ is a communication node identity associated with communication node i.

In a second possible implementation form of the method according to the first implementation form of the fourth aspect, the communication node identities $C_i$, i=1, ..., N, are orthogonal code sequences.

In a third possible implementation form of the method according to the first or second implementation forms of the fourth aspect, the beam forming information $\phi_i$ is phase shift information for the antenna elements of communication node i.

In a fourth possible implementation form of the method according to the third implementation form of the fourth aspect, the phase shift information is a phase shift difference between neighboring antenna elements, or a phase shift for each antenna element.

In a fifth possible implementation form of the method according to the any of the previous implementation forms of the method according to the fourth aspect or the method as such, the method further comprises generating a composite power level signal, wherein the composite power level signal indicates transmission power levels for the communication nodes; and transmitting the composite power level signal to at least one communication node of the path.

In a sixth possible implementation form of the method according to the any of the previous implementation forms of the method according to the fourth aspect or the method as such, the control node is located in the source communication node.

In a seventh possible implementation form of the method according to the sixth implementation form of the fourth aspect, the method further comprises transmitting the composite beam control signal S to a first intermediate communication node of the path.

According to a fifth aspect of the invention, the above mentioned and other objectives are achieved by a method for a wireless multi-hop communication system; the method comprising receiving a composite beam control signal S, wherein the composite beam control signal S comprises antenna beam control information for communication nodes of a communication path comprising a source communication node, at least one intermediate communication node and a destination communication node; deriving antenna beam control information associated with the communication node (300) from the composite beam control signal S; and controlling the beam of the reception antenna elements or the beam of the transmission antenna elements according to the antenna beam control information.

In a first possible implementation form of the method according to the fifth aspect, the method further comprises forwarding the composite beam control signal S to a next communication node of the communication path.

In a second possible implementation form of the method according to the first implementation form of the fifth aspect or the method as such, the composite beam control signal has the form $$S = \sum_{i=1}^{N} C_i \cdot \phi_i,$$

where $\phi_i$ is the beam forming information for communication node i=1, ..., N, where i=1 is the index for the source communication node and i=N is the index for the destination communication node, and $C_i$ is a communication node identity associated with communication node i.

In a third possible implementation form of the method according to the second implementation form of the fifth aspect, the method further comprises deriving the beam forming information $\phi_i$ for the communication node (300) according to the formula $$S \cdot C_i = (\sum_{i=1}^{N} C_i \cdot \phi_i) \cdot C_i = \phi_i.$$

In a fourth possible implementation form of the method according to the second or third implementation form of the fifth aspect, the beam forming information $\phi_i$ is phase shift information; and the method further comprises controlling the beam of the reception antenna elements or the beam of the transmission antenna elements by phase shifting the reception antenna elements or phase shifting the transmission antenna elements according to the phase shift information.

In a fifth possible implementation form of the method according any of the previous implementation forms of the fifth aspect, the method further comprises receiving a composite power level signal, wherein the composite power level signal indicates transmission power levels for the communication nodes;

deriving the transmit power level associated with the communication node from the composite power level signal; and transmitting on the transmission antenna elements with the derived power level.

In a sixth possible implementation form of the method according any of the previous implementation forms of the fifth aspect, the processor is a processing circuitry, and the method further comprises deriving the antenna beam control information by analogue signal processing.

In an seventh possible implementation form of the method according any of the previous implementation forms of the fifth aspect, the method further comprises controlling the beam of the transmit antenna elements according to the antenna beam control information, while controlling the beam of the reception antenna elements in a static omni-directional or wide beam forming state.

The advantages of the methods according to the fourth aspect or the fifth aspect are the same as those for the corresponding device claims according to the first and second aspects.

The present invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
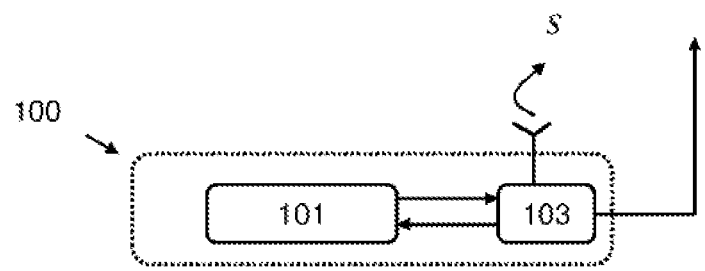
FIG. 1 shows a control device according to an embodiment of the present invention.

Current wireless communication systems often comprise multiple communication nodes, or only "node" in short, of different types. The terminology "communication node" or "node" includes but is not limited to a user terminal device (e.g. a User Equipment, UE, in Long Term Evolution terminology) or a network node, or any other type of communication devices capable of operating in a wireless or wire-line communication system. The terminology "network node" includes but is not limited to a base station, a Node-B or eNode-B, an access point, a relay node, a base station controller, an aggregation point or any other type of interfacing communication device of a radio network and/or a wireless communication system.

In a multi-hop communication system information/data/payload is transferred from a source node (or start node) to a destination node (or end node) via one or more intermediate nodes of a communication path. When mentioned intermediate nodes are working in a wireless manner they are called multi-hop intermediate nodes.

As the conditions of the wireless communication system changes, there is a need to change the communication path for information/data/payload to be transmitted from the source node to the destination node. Those conditions include but are not limited to the addition of the new node, or the removal of one node in the communication path. The addition/removal of the nodes in a communication path can be arranged e.g. in the manner of sleeping or waking up nodes in order to save energy. That is to put one node into sleep mode when there is no data traffic and to wake up the node when there is data traffic to be passed through this particular node. The connection from one node to another node may have to be modified due to the mobility of certain nodes, for example of user terminal equipments or mobile stations.

The change of the connection of nodes can be implemented as the change of beam direction of transmitter antennas or beam direction of receiver antennas of the nodes. For example, normally an antenna beam of a transmitter antenna is used to aim towards the intended receiver and an antenna beam of a receiver antenna is used to aim towards the intended transmitter in order to increase the reception quality. The antenna of the transmitter and/or the receiver often comprise multiple antenna elements and antenna beams are created or steered by imposing different signals to those multiple antenna elements.

In conventional implementation of beamforming of multi-hop networks, the direction from node A to node B is often stored in a memory device of node A. When needed, for example demanded by a controller, node A will take out the direction information and then steer its antenna beam towards node B according to the direction information. This memory-processor based processing may cause latency within each node and the overall latency of the multi-hop network may become intolerable for certain wireless communication architectures or applications.

In a Cloud type wireless communication architecture, most of the signalling processing is done in a central node, i.e. in the Cloud. After signal processing, the resulting radio signal is sent to the receiving destination node. Sometimes the processing of the central node will depend on the feedback information from the receiving destination node. This means higher requirements on the overall latency of the network.

According to embodiments of the present invention, in order to control the beam of antennas of nodes of a communication path, a control device will send/transmit/transfer a single composite beam control signal including antenna beam control information to nodes of the communication path. The beam control information can include control information for transmission antenna and/or reception antenna elements for the nodes.

FIG. 1 shows an embodiment of a control device 100 according to an embodiment of the present invention. The control device 100 comprises a processor 101 communicably coupled to a transmitter 103. The processor 101 is configured to generate a composite beam control signal S and the transmitter 103 is configured to transmit the composite beam control signal S to at least one communication node in a communication path comprising a source communication node, at least one intermediate communication node and a destination communication node.

In FIG. 1 two different ways of sending or transmitting the composite beam control signal to the at least one communication node is illustrated. The composite control signal can be sent by means of a wireless communication link (illustrated by the antenna) or by means of a wired communication link (illustrated with the arrow from the transmitter 103). Also the combination of wireless and wired link to the at least one communication node can be used.

Generally, the present control device 100 can be located or integrated in the source communication node or be located somewhere else in the multi-hop communication system. In the first case the composite beam control signal S is transmitted by the source communication node to the first intermediate communication node of the communication path. In the latter case the composite beam control signal S is transmitted to the source communication node which forwards/relays the composite beam control signal to the first intermediate communication node, which in turn forwards the composite beam control signal to the second intermediate communication node, and so on such that the composite beam control signal reaches the destination communication node by propagating through the multi-hop communication system.

Figure 2:
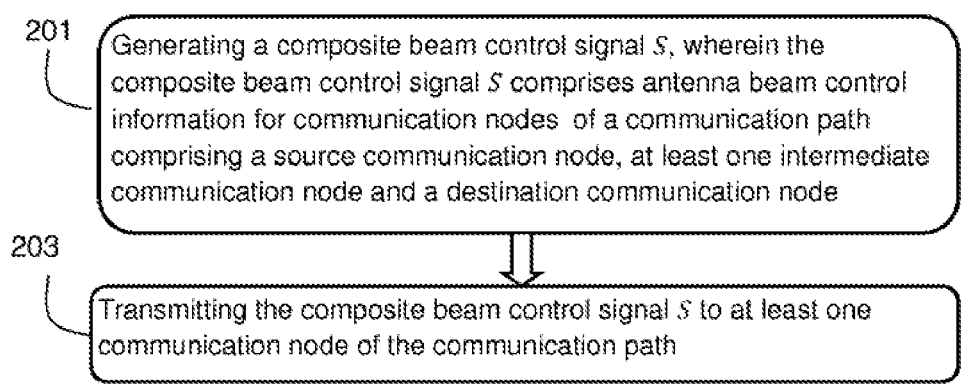
FIG. 2 shows a flow chart of a method for a multi-hop communication system according to an embodiment of the present invention.

FIG. 2 shows a corresponding method for a multi-hop communication system. As disclosed the method comprises the steps of generating 201 a composite beam control signal S, wherein the composite beam control signal S comprises antenna beam control information for communication nodes of a communication path comprising a source communication node, at least one intermediate communication node and a destination communication node. The method further comprises the step of transmitting 203 the composite beam control signal S to at least one communication node of the communication path. The method may e.g. be executed by a control device 100 according to an embodiment of the present invention.

The control device 100 may be a central control device in a centralised network configuration. However, the control device may also be part of a distributed network configuration in which two or more control device are responsible for different parts of the network. The present control device 100 has the functions and capabilities for controlling the beam forming of the antennas of the communication nodes of the communication path. For example, the control device may be a network management server, a network element manager, an operations support server or a network optimization server. It may further be part of a network management system, an Operations Administration and Management (OAM) system or a network control element. The purpose of controlling the antenna direction of the nodes may be to establish a wireless multi-hop connection from the source node to the destination node (the information sink) in order to transmit payload data.

The present composite beam control signal S may be transmitted together with the payload data so as to reduce signalling overhead. However, the signal S can also be sent as a separate independent signal in the system.

Figure 3:
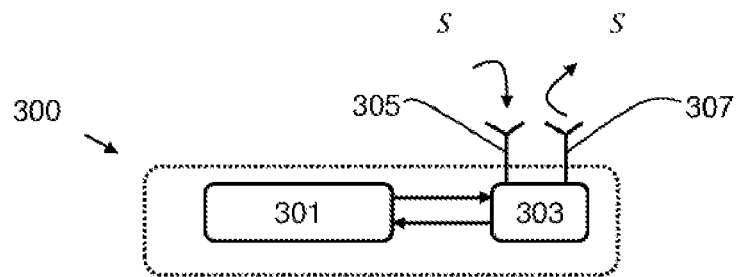
FIG. 3 shows a communication node device according to an embodiment of the present invention.

Moreover, FIG. 3 shows an embodiment of a communication node 300f according to an embodiment of the present invention. The communication node 300 comprises a processor 301 and a transceiver 303, wherein the processor 301 and the transceiver 303 are communicably coupled to each other. The communication node 300 also comprises, in this case, reception antenna elements 305 and transmission antenna elements 307 coupled to the transceiver 303. The transceiver 303 is configured to receive a composite beam control signal S, e.g. from a control device 100 or from a previous communication node of a communication path, via the reception antenna elements 305. Further, the processor 301 is configured to derive antenna beam control information associated with the communication node 300 from the composite beam control signal S. Finally, the processor 301 is configured to control the beam of the reception antenna elements 305 and/or the beam of the transmission antenna elements 307 according to the derived antenna beam control information.

It is also shown in FIG. 3 how the composite beam control signal S is transmitted by the transceiver 303 via the transmission antenna elements 307 to the next node in the communication path according to an embodiment of the present invention.

Figure 4:
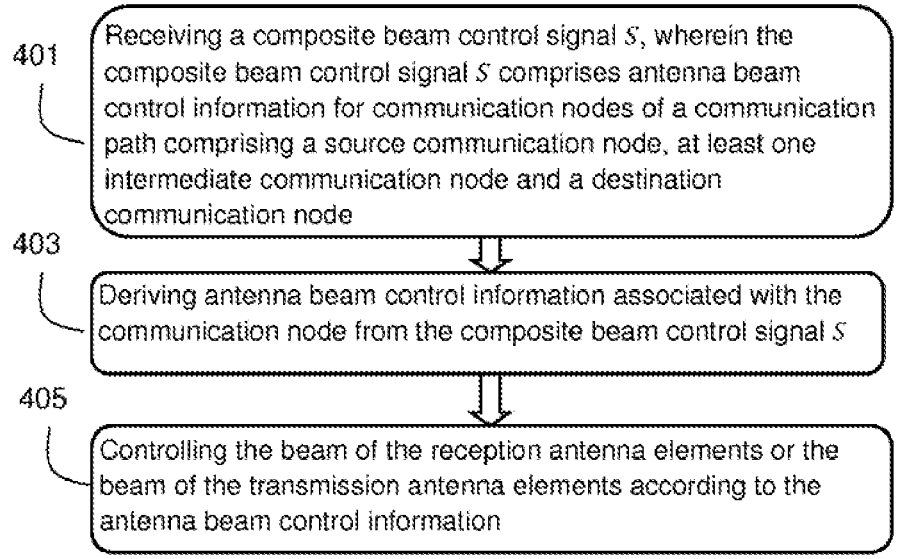
FIG. 4 shows a flow chart of a method for a multi-hop communication system according to an embodiment of the present invention.

FIG. 4 shows a corresponding method for a multi-hop communication system. The method comprises the step of receiving 401 a composite beam control signal S. Further, the method comprises the step of deriving 403 antenna beam control information associated with the communication node from the composite beam control signal S. Finally, the method comprises the step of controlling 405 the beam of the reception antenna elements or the beam of the transmission antenna elements according to the antenna beam control information. The method may e.g. be executed in a communication node 300 of a multi-hop communication system.

According to an embodiment of the present invention, the composite beam control signal S can be described as:

$$S = \sum_{i=1}^{N} C_i \cdot \Phi_i, \quad (1)$$

where $\Phi_i$ is the beam forming information for communication node i=1, ..., N, wherein i=1 is the index for the source communication node and i=N is the index for the destination communication node, and $C_i$ is a communication node identity associated with communication node i.

$C_i$ is node specific information so that node i will be able to only receive its own beam-forming information $\Phi_i$ and ignore beam-forming information which is intended for other nodes of the communication path. Therefore, $C_i$ can be an orthogonal code sequence and when node i receives the composite beam-forming signal, it can derive its own beam-forming information $\Phi_i$ by using the expression:

$$S \cdot C_i = (\sum_{i=1}^{N} C_i \cdot \Phi_i) \cdot C_i = \Phi_i \quad (2)$$

where $\Phi_i$ is the beam forming information for communication node i=1, ..., N, wherein i=1 is the index for the source communication node and i=N is the index for the destination communication node, and $C_i$ is a communication node identity associated with communication node i.

Figure 5:
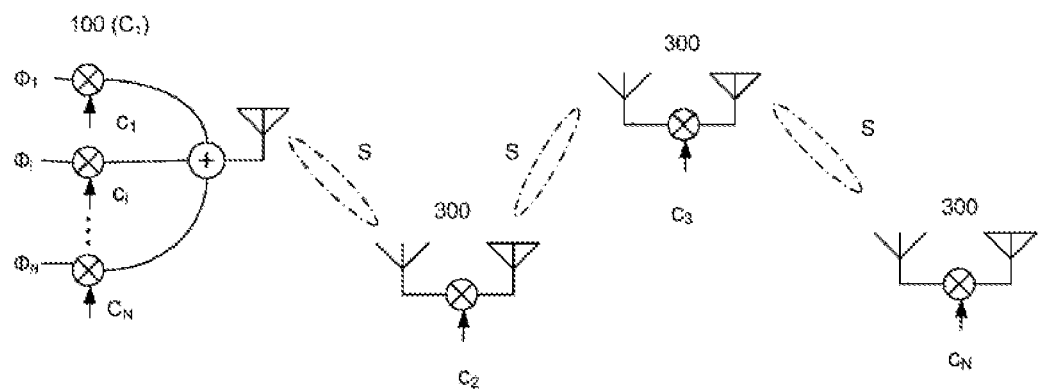
FIG. 5 shows an embodiment of a multi-hop communication system according to the present invention.

FIG. 5 illustrates a multi-hop communication system 500 according to an embodiment of the present invention. In FIG. 5 the leftmost device is the control device 100 and there is a communication path from the source node to the destination node in the multi-hop communication system. In this particular example the control device 100 is a part of the source node. The control device 100 determines and generates beam-forming information for nodes of the communication path. In order to generate beam-forming information for the nodes of the communication path, the control device 100 needs knowledge of for example the position of the communication node, as well as the properties of the transmission antennas and/or the reception antennas. The control device 100 uses node specific spreading codes $C_i$ to spread the beam-forming information of node i. By summing up the beam-forming information after spreading the beam-forming information for the nodes of the communication path, the control device 100 generates the composite beam-forming signal S and sends it to the first intermediate node i=2 in this case since the control device 100 is part of the source node. On receiving the composite beam-forming signal S, the first intermediate node i=2 de-spreads the composite signal S with its own spreading code $C_2$ and takes out the beam-forming information which is intended for itself, i.e. the first intermediate node. Therefore, according to an embodiment of the present invention, the communication node 300 identities $C_i$, i=1, ..., N, are orthogonal code sequences, i.e. they are all orthogonal to each other.

The processor 301 (or dedicated beam-forming circuitry) of the first intermediate node, based on the beam-forming information derived from the composite beam control signal S, tunes its transmission antenna beam accordingly towards the second intermediate node $C_3$. In a similar manner, the first intermediate node can tune its reception antenna beam towards the previous node, i.e. the source node in this case.

The composite beam control signal S will be forwarded by the first intermediate node $C_2$ to the second intermediate node $C_3$, e.g. together with payload data which is to be transferred from the source node $C_1$ to the destination node $C_N$. The next intermediate node $C_i$, upon receiving the composite beam control signal S, will execute the same dispreading operation as described above, and tune its antenna beam direction and forward the composite beam control signal S and the payload data as well to the next node in the communication path, and so on.

Hence, upon receiving the composite beam control signal S, each node will take out its own beamforming information and change its antenna beam direction accordingly by controlling the antenna elements, and forward/transmit the composite beam control signal S to the next node of the communication path in a receiving-forwarding manner. If necessary, the composite beam control signal S may be amplified when transmitted to the next node of the communication path.

The operation of taking out its own beam-forming information, performing its own beam-forming and of receiving-amplifying-forwarding signal S can be implemented such that only hardware circuitry is involved and therefore no need for digital processing involving processor, memory and software is needed. The hardware oriented implementation according to this embodiment can make the overall latency minimal since no latency of memory access and digital processing have to occur. Therefore, the processor 301 in this embodiment is a dedicated processing circuitry, and the antenna beam control information is derived by pure analogue signal processing instead of digital signal processing.

According to another embodiment of the present invention, the beam forming information $\Phi_i$ is phase information or phase shift information for the antenna elements of communication node i. According to yet another embodiment of the present invention, the phase shift information is a phase shift difference between neighbouring antenna elements, or a phase shift for each antenna element.

According to the above described embodiments beam-forming for node i can be implemented as in the below example of Table 1. In this example there are four antenna elements for the transmission antenna of node i, and each antenna element can be assign one of eight possible phases and, e.g. $\Phi_i=\{000;001;010;011\}$ will specify phases for the four antenna elements of node i as $\{0;\ \pi/8;\ \pi/4;\ 3\pi/8\}$ according to Table 1.

TABLE 1

| 0 | 0 | 0 | 0 |
|---|---|---|---|
| 0 | 0 | 1 | $\pi/8$ |
| 0 | 1 | 0 | $\pi/4$ |
| 0 | 1 | 1 | $3\pi/8$ |
| 1 | 0 | 0 | $\pi/2$ |
| 1 | 0 | 1 | $5\pi/8$ |
| 1 | 1 | 0 | $3\pi/4$ |
| 1 | 1 | 1 | $7\pi/8$ |

However, the beamforming information (or configuration) can instead be signalled as phase shift difference between neighbouring antenna elements rather than the phase shifts for each antenna element as described above. This is particular applicable when the antenna element placement is regular and the phase shift pattern is also regular such that only one base phase value and one (or a small number of) phase shift values are needed to control such regular structured antenna elements. It is in this case sufficient to signal one value for each dimension of the antenna array. For example, in a two dimensional antenna array the signal could comprise $\{\pi/8;\ 3\pi/4\}$ to indicate that the phase shift between neighbouring elements in the x-dimension should be $\pi/8$ and the difference between neighbouring elements in the y-dimension should be $3\pi/4$. This embodiment has the advantage that the amount of information in the configuration signal is independent of the number of antenna elements.

Furthermore, the operation of equations (1) and (2) above can be performed with conventional spreading and de-spreading operations with orthogonal code as in CDMA or WCDMA systems. Each node 300 in the communication path is assigned one unique orthogonal code, such that, after de-spreading, node i will only take out the beamforming information intended for itself, i.e. $\Phi_i$. Further $\Phi_i$ is used to tune the antenna beam direction which is illustrated in FIG. 6.

Figure 6:
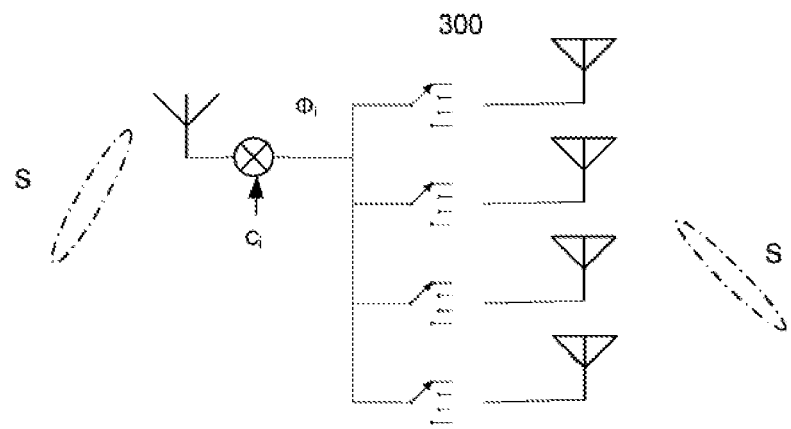
FIG. 6 illustrates a method in an intermediate communication node according to an embodiment of the present invention.

FIG. 6 shows the method in an intermediate node i (300) of the communication path. Node i receives the composite beam-forming signal S, and the received composite beam-forming signal S is de-spread with spread code $C_i$ and the beam-forming information for node i ($\Phi_i$) will be derived. As described above, the beamforming information may be phase information for each antenna element of the transmission antenna of node i. The beam direction of the node i transmission antenna will be tuned as to aim at the next intermediate node $C_{i+1}$. Also the composite beamforming signal S will be relayed from node $C_i$ to node $C_{i+1}$ through the communication path.

In an embodiment of the present invention, only the transmitting antenna of the node is regulated by the composite beam-forming signal and the receiving antenna of the node always assume omni-directional antenna beam or a wide antenna beam such that it can always receive signal from different direction. Since the reception quality of one radio link is impacted by both the transmission antenna and reception antenna, if the transmission antenna gain is high enough, omni-directional antenna can be used. One benefit of such arrangement is to have lower chance of miss-alignment of the transmission beam and reception beam. That is, with omni-directional reception antenna, only the transmission antenna beam direction needs to be optimized.

In another embodiment of the present invention, the receiver antenna of a node 300 switches to a configuration where it can receive from more than one direction, for example omni-directionally, when it is not receiving any transmission. This reception mode can be used both to initially detect a transmission and in case of failures where a new communication path has to be found. With the less directionally sensitive configuration of the receive antenna it is simpler for the receiving node to detect the antenna configuration signal.

In yet another embodiment of the present invention, the composite beam control signal S can be transmitted with different power levels for different nodes i of the communication path. If the control device knows beforehand that node i+1 will have a lower receiving antenna gain when receiving the composite beam control signal transmitted from node i, the control device can set the transmission power value higher for intermediate node i such that the transmission from node i to node i+1 will be successful. The transmission power values for intermediate nodes are pre-set by the control device 100 in the similar manner as for controlling the beam direction by the use of the composite beam control signal S. Therefore, according to this embodiment a single composite power level signal is generated by the control device 100 and transmitted to at least one node in the communication path. In one example the composite power level signal may be part of the composite beam control signal S. In another example the composite power level signal could be transmitted as a separate signal in the communication path depending on the application.

In an embodiment of the present invention, two nodes 300 can use the same code for spreading and de-spreading if these two nodes can be distinguished by the control node, e.g. by their geographic positions. This allows a geographical reuse of the codes which reduces the need for a very large code space. The constraint that is imposed on the positions is that no nodes with the same code should be on the same communication path. In network topologies where the communication paths are not very long this will be relatively simple to ensure by having a certain geographic distance between nodes with the same code. In networks where the possible topologies are quite simple, e.g. tree topology, it is also relatively simple to plan the code assignment so that there is no reuse of the same code on a single communication path.

A useful application of embodiments of the present invention is in the backhaul of a wireless network. It would typically be used on high frequency spectrum bands as it is in general more effective to implement beamforming on high frequency spectrum band, however the disclosed solution is not limited to any specific spectrum bands. With an increasing number of base stations in radio networks the backhaul is becoming more important and costly. Wireless backhaul is practical since it is in general cheaper to deploy than wired backhaul. With the present invention it is also possible to reconfigure the topology of the backhaul, which is an advantage in radio networks with a dense deployment of base stations where base stations may be powered on and off depending on variations in the traffic load.

Furthermore, any method according to the present invention may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

It should however be remembered that some of the methods according to the present invention may be executed in hardware in the form of dedicated processing circuitry for reduced latency.

Moreover, it is realized by the skilled person that the present control device and communication node comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present scheduler, sender, receiver and network nodes, may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A control device for a wireless multi-hop communication system, the control device comprising:

a processor; and
a transmitter; wherein the processor is configured to generate a composite beam control signal S, wherein the composite beam control signal S comprises antenna beam control information for communication nodes of a communication path comprising a source communication node, at least one intermediate communication node and a destination communication node; and wherein the transmitter is configured to transmit the composite beam control signal S to at least one communication node of the communication path, wherein the composite beam control signal S has the form $$S = \sum_{i=1}^{N} C_i \cdot \Phi_i,$$

where $\Phi_i$ is the beam forming information for communication node $i=1, \ldots, N$, where $i=1$ is the index for the source communication node and $i=N$ is the index for the destination communication node, and $C_i$ is a communication node identity associated with communication node i.

2. The control device according to claim 1, wherein the communication node identities $C_i$, $i=1, \ldots, N$, are orthogonal code sequences.

3. The control device according to claim 1, wherein the beam forming information $\Phi_i$ is phase information or phase shift information for the antenna elements of communication node i.

4. The control device according to claim 3, wherein the phase shift information is a phase shift difference between neighbouring antenna elements, or a phase shift for each antenna element.

5. The control device according to claim 1, wherein the processor further is configured to generate a composite power level signal, wherein the composite power level signal indicates transmission power levels for the communication nodes; and wherein the transmitter further is configured to transmit the composite power level signal to at least one communication node of the path.

6. A communication node for a multi-hop communication system, the communication node comprising:

a processor;
a transceiver;
reception antenna elements; and
transmission antenna elements; wherein the transceiver is configured to receive a composite beam control signal S, wherein the composite beam control signal S comprises antenna beam control information for communication nodes of a communication path comprising a source communication node, at least one intermediate communication node and a destination communication node; wherein the processor is configured to derive antenna beam control information associated with the communication node from the composite beam control signal S; and control the beam of the reception antenna elements or the beam of the transmission antenna elements according to the antenna beam control information, wherein the composite beam control signal has the form $$S = \sum_{i=1}^{N} C_i \cdot \Phi_i,$$

wherein $\Phi_i$ is the beam forming information for communication node $i=1, \ldots, N$, where $i=1$ is the index for the source communication node and $i=N$ is the index for the destination communication node, and $C_i$ is a communication node identity associated with communication node i.

7. The communication node according to claim 6, wherein the transceiver further is configured to
forward the composite beam control signal S to a next communication node of the communication path.

8. The communication node according to claim 6, wherein the processor further is configured to
derive the beam forming information $\Phi_i$ for the communication node according to $$S \cdot C_i = (\Sigma_{i=1}^{N} C_i \cdot \Phi_i) \cdot C_i = \Phi_i.$$

9. The communication node according to claim 6, wherein the beam forming information $\Phi_i$ is phase information or phase shift information; and wherein the processor further is configured to
control the beam of the reception antenna elements or the beam of the transmission antenna elements by phase shifting the reception antenna elements or phase shifting the transmission antenna elements according to the phase shift information.

10. The communication node according to claim 6, wherein the transceiver further is configured to
receive a composite power level signal, wherein the composite power level signal indicates transmission power levels for the communication nodes; wherein the processor further is configured to
derive the transmit power level associated with the communication node from the composite power level signal; and wherein the transceiver further is configured to transmit on the transmission antenna elements with the derived power level.

11. The communication node according to claim 6, wherein the processor is a processing circuitry, and wherein the processing circuitry is configured to
derive the antenna beam control information by analogue signal processing.

12. A wireless multi-hop communication system comprising:
at least one control device; and
at least one communication node, wherein the control device comprising a processor and a transmitter, the processor is configured to:
generate a composite beam control signal S, wherein the composite beam control signal S comprises antenna beam control information for communication nodes of a communication path comprising a source communication node, at least one intermediate communication node and a destination communication node; and wherein the transmitter is configured to transmit the composite beam control signal S to at least one communication node of the communication path; wherein the communication node comprising a processor, a transceiver, reception antenna elements and transmission antenna elements, the transceiver is configured to:
receive a composite beam control signal S, wherein the composite beam control signal S comprises antenna beam control information for communication nodes of a communication path comprising a source communication node, at least one intermediate communication node and a destination communication node; wherein the processor is configured to derive antenna beam control information associated with the communication node from the composite beam control signal S; and
control the beam of the reception antenna elements or the beam of the transmission antenna elements according to the antenna beam control information, wherein the processor further is configured to
derive the beam forming information $\Phi_i$ for the communication node according to $$S \cdot C_i = (\Sigma_{i=1}^{N} C_i \cdot \Phi_i) \cdot C_i = \Phi_i.$$

13. A method for a wireless multi-hop communication system; the method comprising:
generating a composite beam control signal S, wherein the composite beam control signal S comprises antenna beam control information for communication nodes of a communication path comprising a source communication node, at least one intermediate communication node and a destination communication node; and
transmitting the composite beam control signal S to at least one communication node of the communication path, wherein the composite beam control signal S has the form $$S = \Sigma_{i=1}^{N} C_i \cdot \Phi_i,$$

where $\Phi_i$ is the beam forming information for communication node i=1, ..., N, where i=1 is the index for the source communication node and i=N is the index for the destination communication node, and $C_i$ is a communication node identity associated with communication node i.

14. A method for a wireless multi-hop communication system; the method comprising:
receiving a composite beam control signal S, wherein the composite beam control signal S comprises antenna beam control information for communication nodes of a communication path comprising a source communication node, at least one intermediate communication node and a destination communication node;
deriving antenna beam control information associated with the communication node from the composite beam control signal S;
controlling the beam of the reception antenna elements of the beam of the transmission antenna elements according to the antenna beam control information, and
deriving the beam forming information $\Phi_i$ for the communication node according to $$S \cdot C_i = (\Sigma_{i=1}^{N} C_i \Phi_i) \cdot C_i = \Phi_i.$$

* * * * *

UNITED STATES PATENT AND TRADEMARK OFFICE
CERTIFICATE OF CORRECTION

PATENT NO. : 10,097,253 B2  
APPLICATION NO. : 15/592478  
DATED : October 9, 2018  
INVENTOR(S) : Tao Cai et al.

Page 1 of 1

It is certified that error appears in the above-identified patent and that said Letters Patent is hereby corrected as shown below:

In the Claims

Column 16, Line 13, In Claim 1, delete "$S=\Sigma_{i=1}^{N} C_i \cdot \Phi_i,$" and insert -- $S = \sum_{i=1}^{N} C_i \cdot \Phi_i,$ --, therefor.

Column 16, Line 59, In Claim 6, delete "$S=\Sigma_{i=1}^{N} C_i \cdot \Phi_i,$" and insert -- $S = \sum_{i=1}^{N} C_i \cdot \Phi_i,$ --, therefor.

Column 17, Line 10, In Claim 8, delete "$S \cdot C_i = (\Sigma_{i=1}^{N} C_i \cdot \Phi_i) \cdot C_i = \Phi_i.$" and insert -- $S \cdot C_i = \left(\sum_{i=1}^{N} C_i \cdot \Phi_i\right) \cdot C_i = \Phi_i.$ --, therefor.

Column 18, Line 16, In Claim 12, delete "$S \cdot C_i = (\Sigma_{i=1}^{N} C_i \cdot \Phi_i) \cdot C_i = \Phi_i.$" and insert -- $S \cdot C_i = \left(\sum_{i=1}^{N} C_i \cdot \Phi_i\right) \cdot C_i = \Phi_i.$ --, therefor.

Column 18, Line 29, In Claim 13, delete "$S=\Sigma_{i=1}^{N} C_i \cdot \Phi_i,$" and insert -- $S = \sum_{i=1}^{N} C_i \cdot \Phi_i,$ --, therefor.

Column 18, Line 52, In Claim 14, delete "$S \cdot C_i = (\Sigma_{i=1}^{N} C_i \cdot \Phi_i) \cdot C_i = \Phi_i.$" and insert -- $S \cdot C_i = \left(\sum_{i=1}^{N} C_i \cdot \Phi_i\right) \cdot C_i = \Phi_i.$ --, therefor.

Signed and Sealed this  
Second Day of July, 2019

Andrei Iancu  
*Director of the United States Patent and Trademark Office*